US010113105B2

(12) United States Patent
Reddy et al.

(10) Patent No.: US 10,113,105 B2
(45) Date of Patent: Oct. 30, 2018

(54) HYDROPHOBIZING AGENTS COMPRISING AN OLIGOMERIC POLYAMINE AND METHODS FOR COATING PARTICULATES THEREWITH

(71) Applicant: Halliburton Energy Services, Inc., Houston, TX (US)

(72) Inventors: B. Raghava Reddy, The Woodlands, TX (US); Feng Liang, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 139 days.

(21) Appl. No.: 15/103,432

(22) PCT Filed: Jan. 13, 2014

(86) PCT No.: PCT/US2014/011220
§ 371 (c)(1),
(2) Date: Jun. 10, 2016

(87) PCT Pub. No.: WO2015/105507
PCT Pub. Date: Jul. 16, 2015

(65) Prior Publication Data
US 2016/0304771 A1    Oct. 20, 2016

(51) Int. Cl.
C09K 8/80   (2006.01)
C09K 8/03   (2006.01)
C09K 8/56   (2006.01)
C09D 179/02 (2006.01)

(52) U.S. Cl.
CPC ............ *C09K 8/805* (2013.01); *C09D 179/02* (2013.01); *C09K 8/03* (2013.01); *C09K 8/56* (2013.01)

(58) Field of Classification Search
None
See application file for complete search history.

(56) References Cited

U.S. PATENT DOCUMENTS

| 5,775,425 A | 7/1998 | Weaver et al. |
| 6,047,772 A | 4/2000 | Weaver et al. |
| 7,392,847 B2 | 7/2008 | Gatlin et al. |

(Continued)

FOREIGN PATENT DOCUMENTS

WO    2015105507 A1    7/2015

OTHER PUBLICATIONS

International Search Report and Written Opinion for PCT/US2014/011220 dated Oct. 27, 2014.

*Primary Examiner* — Jeffrey D Washville
(74) *Attorney, Agent, or Firm* — McGuireWoods LLP

(57) ABSTRACT

Rendering a surface hydrophobic without tackifying the surface, wherein the surface may be a particulate surface. Methods for forming a coating on one or more particulates may comprise: providing a composition comprising a hydrophobizing agent comprising an oligomeric polyamine having a carbon atom:nitrogen atom ratio of about 4:1 or more, and a plurality of hydrophobic groups bonded to at least a portion of the nitrogen atoms in the oligomeric polyamine; and forming coated particulates comprising a coating of the hydrophobizing agent on one or more particulates. Illustrative particulates that may be coated include those that are present in a subterranean formation or that are to be introduced to a subterranean formation.

16 Claims, 1 Drawing Sheet

(56) References Cited

U.S. PATENT DOCUMENTS

| | | |
|---|---|---|
| 7,956,017 B2 | 6/2011 | Gatlin et al. |
| 8,105,986 B2 | 1/2012 | Zhang |
| 2005/0051331 A1 | 3/2005 | Nguyen et al. |
| 2007/0007010 A1 | 1/2007 | Welton et al. |
| 2007/0079965 A1* | 4/2007 | Nguyen .................. C09K 8/68 166/279 |
| 2010/0186954 A1 | 7/2010 | Nguyen et al. |
| 2011/0253374 A1 | 10/2011 | Reyes et al. |
| 2016/0208157 A1* | 7/2016 | Vo ......................... C09K 8/035 |

* cited by examiner

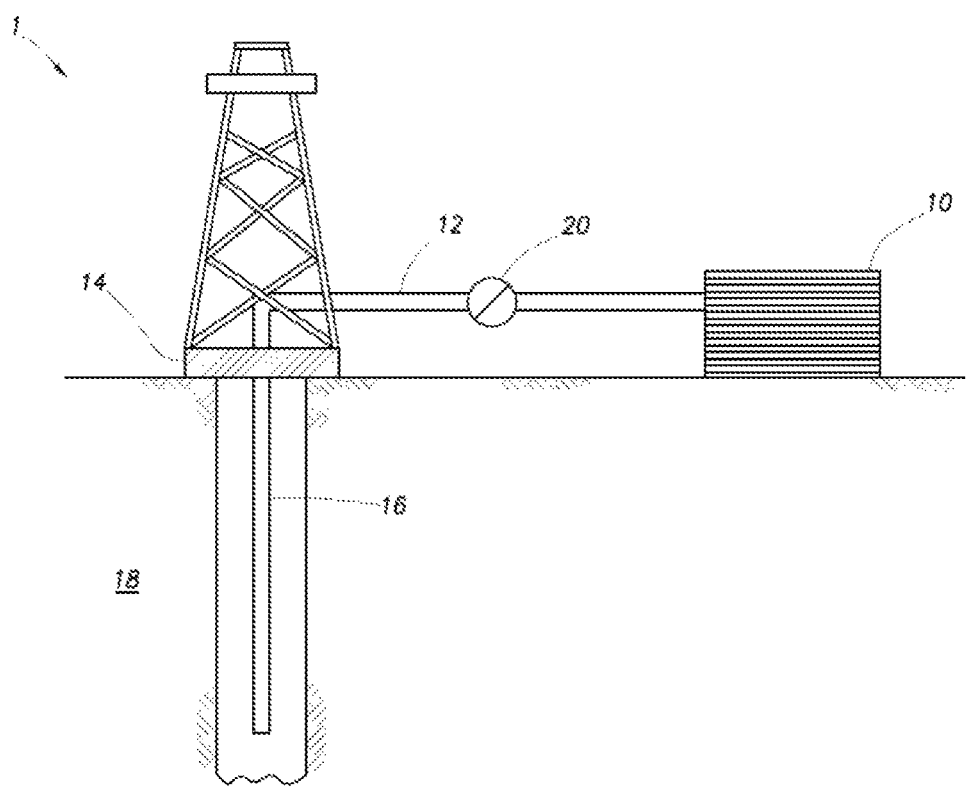

HYDROPHOBIZING AGENTS COMPRISING AN OLIGOMERIC POLYAMINE AND METHODS FOR COATING PARTICULATES THEREWITH

BACKGROUND

The present disclosure generally relates to particulate coatings, and, more specifically, to hydrophobizing agents and methods for their use in conjunction with forming particulate coatings.

Wellbores are often at least partially located in an unconsolidated portion of a subterranean formation. As used herein, the term "unconsolidated" refers to a subterranean formation that comprises loose particulates (e.g., particulates of sandstones, carbonates, limestones, coal beds, shales, diatomites, chalks, sand, and formation fines) that can migrate within the formation and potentially be produced therefrom. Proppant particulates and other particulates introduced to a subterranean formation during a treatment operation may similarly be subject to migration. Oil, gas, water, and/or treatment fluids may result in migration of these types of loose particulates and others within a wellbore. The presence of loose particulates, such as sand, in a produced fluid may often be undesirable in terms of permeability loss (e.g., in a proppant pack due to plugging with fines) and the cost and time associated with post-production particulate removal from the produced fluid. Furthermore, loose particulates may abrade pumps and other equipment and tools within a wellbore, which is undesirable from a number of standpoints.

One technique that is often used to mitigate the presence of loose particulates and their migration within a wellbore is to perform a consolidation operation that least partially agglomerates the particulates together with one another, although not necessarily through formation of a covalent bond between the particulates. One approach to consolidation may involve forming at least a partial coating of a tackifier on the surface of loose particulates. As used herein, the term "tackifier" refers to a substance that forms a non-hardening coating on the surface of a particulate material. Generally, coatings formed from traditional tackifiers are deformable and sticky to the touch. The sticky character of traditional tackifiers and particulates coated therewith can result in accumulation on various unwanted surfaces within a wellbore (e.g., pumps, pipes, sand screws, and the like). The unwanted accumulation of tackified particulates on tools or other wellbore components can result in damage that may necessitate replacement of the tool or other wellbore components, thereby increasing production costs. Further, in deviated wellbores having a substantially horizontal section, the accumulation of tackified particulates in the substantially horizontal section can be especially problematic due to particulate settling. The accumulation of tackified particulates in an unwanted section of a wellbore can lead to increased pressure within the wellbore, possibly leading to costly formation damage. In any event, consolidation and remediation strategies using traditional tackifiers can involve a significant time and expense when conducting various subterranean operations, not to mention the foregoing issues further complicating their use.

BRIEF DESCRIPTION OF THE DRAWING

The following FIGURE is included to illustrate certain aspects of the present disclosure, and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows an illustrative schematic of a system that can deliver hydrophobizing agents of the present disclosure to a downhole location, according to one or more embodiments.

DETAILED DESCRIPTION

The present disclosure generally relates to particulate coatings, and, more specifically, to hydrophobizing agents and methods for their use in conjunction with forming particulate coatings.

One or more illustrative embodiments incorporating the features of the present disclosure are presented herein. Not all features of a physical implementation are described or shown in this application for the sake of clarity. It is to be understood that in the development of a physical embodiment incorporating the features of the present disclosure, numerous implementation-specific decisions must be made to achieve the developer's goals, such as compliance with system-related, business-related, government-related and other constraints, which may vary by implementation and from time to time. While a developer's efforts might be time-consuming, such efforts would be, nevertheless, a routine undertaking for one of ordinary skill in the art and having benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps.

As used herein, the terms "treat," "treatment," "treating" and other variants thereof refer to any subterranean operation that uses a fluid in conjunction with achieving a desired function and/or for a desired purpose. Use of these terms does not imply any particular action by the treatment fluid or a component thereof unless expressly described as such herein. Illustrative treatment operations can include, for example, fracturing operations, gravel packing operations, acidizing operations, scale dissolution and removal operations, consolidation operations, conformance control operations, fines control operations, and the like.

As described above, there can be some issues associated with the use of traditional tackifiers in various subterranean operations due to their tacky character. In some cases these issues can be outweighed by the desirable benefits obtained, such as when stabilizing a particulate surface during a consolidation operation by forming a consolidated mass, for example. When not necessarily forming a consolidated mass, such as when controlling fines or other abrading particulates within a subterranean formation, the issues associated with the tacky character of traditional tackifying agents may compete with the benefits obtained. That is, the undesired accumulation of the tackifying agent within a wellbore may outweigh the benefits attained during a fines control operation. If the migration of fines and other loose particulates in a wellbore could be controlled in some manner without adhering them to a tacky surface, the foregoing issues associated with traditional tackifiers may be avoided.

The present inventors found that highly hydrophobic coatings can function similarly to traditional tackifiers in various consolidation operations, particularly fines control operations. Unlike traditional tackifiers, the hydrophobic coatings described herein are generally non-tacky, but they still have a high capacity for capturing fines while remaining easily coatable on a variety of particulate surfaces. Because they are generally non-tacky, particulates coated with the hydrophobic coatings are much less susceptible to accumulation in an unwanted wellbore location. Through use of the compositions described herein, various subterranean operations may be conducted with decreased process downtime and lower production costs for a well operator.

More specifically, the present inventors discovered that oligomeric polyamines having a high carbon atom:nitrogen atom ratio can be used to form the foregoing types of hydrophobic coatings. As used herein, the term "carbon atom:nitrogen atom ratio" refers to the ratio of the gross number of carbon atoms to the gross number of nitrogen atoms in a compound, without reference to the type of functional group in which the carbon atoms or nitrogen atoms are found. In this regard, a number of oligomeric polyamines having a carbon atom:nitrogen atom ratio of about 4:1 or greater are commercially available and may be used in conjunction with the various embodiments described herein. Hydrophobic modification of at least a portion of the amine nitrogen atoms can be used to further elevate the carbon atom:nitrogen atom ratio of the oligomeric polyamines, thereby increasing their hydrophobic character. Since oligomeric polyamines having a carbon atom:nitrogen atom ratio of about 4:1 or greater are already fairly hydrophobic even before further hydrophobic modification, the extent of further functionalization needed to render them sufficiently hydrophobic to form a particulate coating may be less than needed for related substances, thereby leading to greater manufacturing tolerances and lower costs. Further, because the oligomeric polyamines are non-polymeric in nature, it is believed that they are less likely to possess an inherent tacky character when coated onto a particulate.

Moreover, the hydrophobic coatings described herein can be formed through wet coating techniques by dispersing particulates in a carrier fluid containing the oligomeric polyamine, or dry coating processes can be used to coat the particulates. Wet coating techniques can be further extended to affect formation of a coating in a wellbore penetrating a subterranean formation by introducing a carrier fluid containing the oligomeric polyamine (i.e., a treatment fluid) thereto. Accordingly, the oligomeric polyamines described herein offer substantial operational flexibility during various coating processes, particularly for achieving fines control.

As used herein, the terms "coat," "coating" and other variants thereof do not imply any particular degree or thickness of coating on a particulate, unless otherwise specified herein. Specifically, these terms do not necessarily imply 100% surface coverage of a given particulate. The term "particulate," as used in this disclosure, includes all known shapes and sizes of materials, including substantially spherical materials, fibrous materials, cubic and other polygonal materials, materials having an irregular shape, and combinations thereof. In some embodiments, the particulates may comprise proppant particulates, illustrative examples of which are described in more detail below. Other types of particulates are also discussed herein.

As used herein, the term "oligomeric" refers to a non-polymeric substance having a repeating backbone structure with about 15 or less repeating units therein.

In various embodiments, compositions described herein may comprise a hydrophobizing agent comprising an oligomeric polyamine having a carbon atom:nitrogen atom ratio of about 4:1 or more, and a plurality of hydrophobic groups bonded to at least a portion of the nitrogen atoms in the oligomeric polyamine.

In various embodiments, the oligomeric polyamines described herein may have a carbon atom:nitrogen atom ratio of about 4:1 or more before being further hydrophobically modified. Illustrative reaction techniques for hydrophobically modifying the oligomeric polyamines are discussed in more detail hereinbelow. In some embodiments, the oligomeric polyamines may be insoluble in water before undergoing hydrophobic modification, and after hydrophobic modification, they may be even more water insoluble. The oligomeric polyamines may be soluble in a variety of fluids, as discussed in more detail below. In some embodiments, the oligomeric polyamines may have a carbon atom:nitrogen atom ratio of about 5:1 or more after being hydrophobically modified, or about 6:1 or more after being hydrophobically modified, or about 7:1 or more after being hydrophobically modified, or about 8:1 or more after being hydrophobically modified, or about 9:1 or more after being hydrophobically modified, or about 10:1 or more after being hydrophobically modified. It is to be recognized that the final carbon atom:nitrogen atom ratio of the oligomeric polyamines following hydrophobic modification may be a function of both the carbon count of the introduced hydrophobic group as well as the degree of hydrophobic substitution. As used herein, the term "degree of hydrophobic substitution" refers to the percentage of available nitrogen atoms in an oligomeric polyamine that have been functionalized with a hydrophobic group.

In various embodiments, the degree of hydrophobic substitution in the oligomeric polyamine may range between about 1% and about 100%. In more particular embodiments, the degree of hydrophobic substitution may range between about 1% and about 50%. In still more particular embodiments, the degree of hydrophobic substitution may range between about 5% and about 50%. The degree of hydrophobic substitution may be altered to a desired degree to promote solubility of the oligomeric polyamine in a specific solvent and/or to convey a desired amount of hydrophobicity to a particulate coating, for example.

In some embodiments, the oligomeric polyamine may comprise amine groups in its backbone. In some embodiments, the oligomeric polyamine may have a structure defined by Formula 1, wherein A and B are carbon-containing groups collectively containing 4 carbon atoms or more, and x is an integer ranging between 1 and about 15.

(Formula 1)

In some embodiments, A and/or B may comprise an amine group bound to the carbon-containing group. The amine group in A and/or B may be functionalized with a hydrophobic group in the hydrophobizing agent. The amine group may be an aliphatic amine, an aromatic amine, or any combination thereof, and it may be primary, secondary, tertiary, or any combination thereof before being functionalized. In embodiments where A and/or B comprises an amine group, A and B collectively comprise sufficient carbon atoms to maintain the carbon atom:nitrogen atom ratio at a level of about 4:1 or more before hydrophobic modification takes place. That is, if two amine groups are present in total, A and B may collectively comprise 8 carbon atoms or more, and if three amine groups are present in total, A and B may collectively comprise 12 carbon atoms or more.

In some embodiments, the oligomeric polyamine may have a structure defined by Formula 2, wherein B comprises a carbon-containing spacer group between the amine group in the oligomeric backbone and the side-chain amine group. C is a carbon-containing group, which may optionally form a ring structure with B. In various embodiments, B and C may comprise an alkyl group, an aryl group, or any combination thereof. In various embodiments, B and C may form a 6-membered ring structure with the side-chain amine group.

(Formula 2)

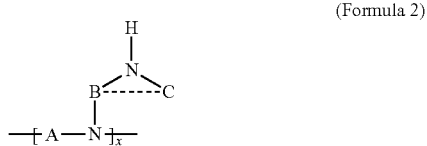

That is, in some embodiments, the combination of B and C with the side-chain amine group may comprise a piperidine group. The piperidine group may comprise a 2,2,6,6-tetraalkylpiperidine group in some embodiments, and a 2,2,6,6-tetramethylpiperidine group in more specific embodiments. In some embodiments, the piperidine nitrogen atom may be bonded to the hydrophobic groups in the hydrophobizing agent. In some embodiments, the piperidine group may be bonded at its 4-position to the amine group of the oligomeric backbone.

In some embodiments, the oligomeric polyamine may have a structure defined by Formula 3 below, wherein D is a carbon-containing chain having 2 carbon atoms or more within the chain, and $B_1$ and $B_2$ are carbon-containing groups, such that $B_1$, $B_2$ and D collectively comprise 8 carbon atoms or more. Optionally, $B_1$ and/or $B_2$ may comprise an amine. Again, x is an integer ranging between 1 and about 15, as defined above.

(Formula 3)

In some embodiments, D may comprise an alkyl chain having between 2 and about 12 carbon atoms within the chain. In more specific embodiments, D may comprise an alkyl chain having a formula of $(CH_2)_y$, wherein y is an integer ranging between 2 and about 12. In some embodiments, $B_1$ and $B_2$ may be the same, and in other embodiments, $B_1$ and $B_2$ may be different.

In some embodiments, the oligomeric polyamine may have a structure defined by Formula 4 below, wherein $B_1$, $B_2$, D and x are defined as above for Formula 3, and E is an aromatic group, such that $B_1$, $B_2$, D and E collectively comprise 8 carbon atoms or more.

(Formula 4)

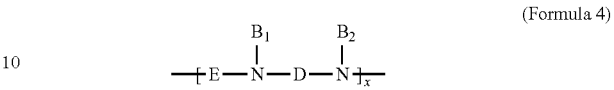

In some embodiments, E may comprise an aryl group, and in other embodiments, E may comprise a heteroaryl group. The substitution pattern connecting E to the backbone of the oligomeric polyamine may vary without limitation, and at least in heteroaryl groups, the substitution pattern may be further determined by the native heteroatom location within the heteroaromatic ring. For aryl groups, the substitution pattern connecting E to the backbone of the oligomeric polyamine may comprise 1,2-substitution (i.e., ortho substitution) in some embodiments, 1,3-substitution (i.e., meta substitution) in other embodiments, or 1,4-substitution para substitution) in still other embodiments. For heteroaryl groups, the substitution pattern may be somewhat more complex in that the orientation of the bonding to the backbone of the oligomeric polyamine with respect to the heteroatom locations within the heteroaryl ring also needs to be considered. For both 5- and 6-membered heteroaryl groups, the substitution pattern may include, without limitation except as dictated by the heteroatom substitution pattern in the heteroaryl ring, 2,3-substitution, 2,4-substitution, 2,5-substitution, 2,6-substitution, 3,4-substitution, and 3,5-substitution. It is to be recognized that the foregoing substitution patterns do not necessarily represent the IUPAC numbering scheme for the particular substitution pattern of a given aryl or heteroaryl group. Suitable heteroaryl groups may include, for example, pyridine groups, pyridazine groups, pyrimidine groups, pyrazine groups, 1,2,4-triazine groups, 1,3,5-triazine groups, furan groups, thiophene groups, pyrrole groups, pyrazole groups, imidazole groups, triazole groups, tetrazole groups, thiazole groups, isothiazole groups, oxazole groups, isoxazole groups and the like.

Additional functionality may also be present on the aryl or heteroaryl group comprising Formula 4. Such additional functionality may be present at any open ring position not bonded to the backbone of the oligomeric polyamine. In more specific embodiments, the additional functionality that may be present on the aryl or heteroaryl group may be present on an amine group that is bonded to the aryl or heteroaryl group. That is, in some embodiments, the oligomeric polyamine may have a structure defined by Formula 5 below, where Z is an alkyl, aryl, or acyl group, and $B_1$, $B_2$, D, E and x are defined as above.

(Formula 5)

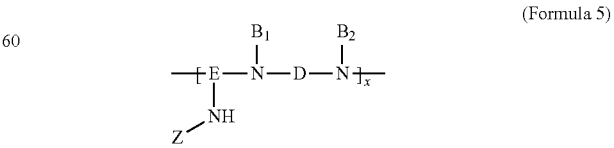

In more specific embodiments, the oligomeric polyamine may have a structure defined by Formula 6 below, where y is an integer ranging between 2 and about 12, and more typically between about 3 and about 10. Again, $B_1$, $B_2$ and x are defined as above.

(Formula 6)

In some embodiments, the oligomeric polyamine may comprise an aromatic group in its backbone. That is, in some embodiments, the oligomeric polyamine may be defined as shown in Formula 7 below, where E is an aryl group or a heteroaryl group. Suitable aryl and heteroaryl groups include those set forth above.

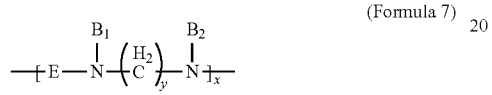
(Formula 7)

In still more specific embodiments, the aryl group or heteroaryl group may comprise a 1,3-substituted phenyl group or a 1,3,5-triazine group, either of which may contain further optional substitution. In some embodiments, the further optional substitution may be through an amine group, as shown in Formulas 8 and 9 below, where Z is defined as above.

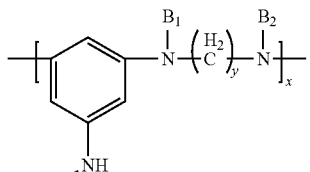
(Formula 8)

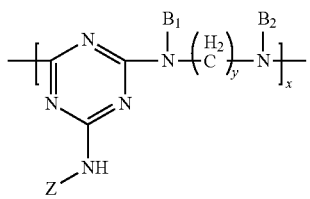
(Formula 9)

In some embodiments, Z may comprise an alkyl group containing a carbon chain or ring comprising about 4 carbon atoms to about 30 carbon atoms, or about 6 carbon atoms to about 20 carbon atoms, or about 8 carbon atoms to about 12 carbon atoms. The carbon chain or ring may be branched or unbranched and optionally contain carbon-carbon unsaturation. Additional heteroatoms may also be present. Illustrative but non-limiting examples of alkyl groups that may comprise Z include, for example, 1-hexyl, 1-octyl, 1-dodecyl, 1-octadecyl, isohexyl, isooctyl, cyclohexyl, cyclooctyl, 1,1,3,3-tetramethylbut-1-yl, and the like. Acyl groups comprising Z may have a similar carbon chain length and chain morphology, but they are further defined by their terminal carbonyl group that forms an amide bond with the aromatic amine. Aryl groups comprising Z may include a phenyl group or a substituted phenyl group.

In some embodiments, the oligomeric polyamine may comprise at least a 2,2,6,6-tetramethylpiperidine moiety. In some embodiments, $B_1$ and/or $B_2$ in Formulas 3-9 may comprise a 2,2,6,6-tetramethylpiperidine moiety. Accordingly, in some embodiments, the oligomeric polyamine may have a structure defined by Formulas 10 and 11 below, where Z, x and y are defined as above.

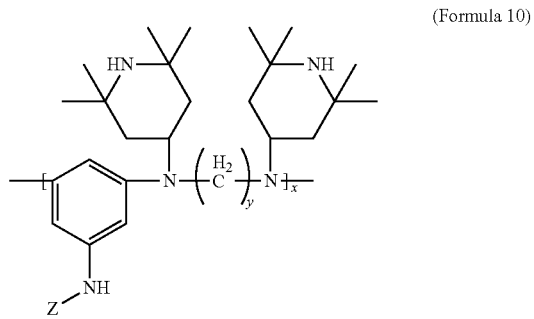
(Formula 10)

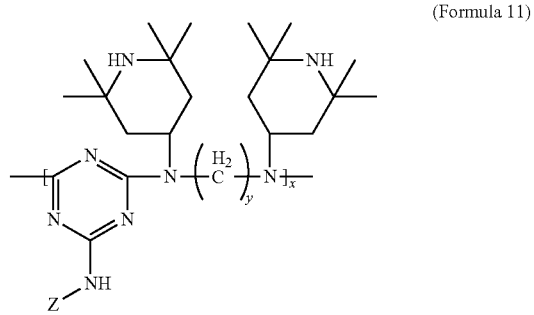
(Formula 11)

Any oligomeric polyamine meeting the above structural definitions may undergo further functionalization with a hydrophobic group to render the oligomeric polyamine even more hydrophobic than it was originally. In general, any oligomeric polyamine that has an open nitrogen valence (i.e., NH groups or a tertiary nitrogen) for further functionalization through acylation or alkylation, including through quaternization, may undergo a reaction to produce an oligomeric polyamine comprising a plurality of hydrophobic groups bonded thereto. In some embodiments, the oligomeric polyamine may be alkylated to produce neutral alkylated amines. That is, in such embodiments, primary or secondary amines in the oligomeric polyamine may be alkylated. In some or other embodiments, the oligomeric polyamine may be alkylated to the extent that the oligomeric polyamine comprises at least one quaternized nitrogen atom. Quaternization may occur through exhaustive alkylation of existing primary or secondary amines in the oligomeric polyamine, or it may occur through alkylation of an existing tertiary amine in the oligomeric polyamine. Acylation may occur in similar locations, except acylation of tertiary amines is not believed to occur. In some embodiments, the hydrophobizing agent may be cationic. In some embodiments, the cationic charge may result from quaternization of at least one nitrogen atom, and in other embodiments, the cationic charge may result from protonation of at least one nitrogen atom (e.g., with an acid).

As discussed above, in some embodiments, the oligomeric polyamine may comprise a 2,2,6,6-tetramethylpiperidine moiety. A number of such oligomeric polyamines are commercially available as hindered amine light stabilizers (HALS) from various suppliers. Illustrative examples of HALS containing a 2,2,6,6-tetramethylpiperidine moiety that may undergo hydrophobization for use in the embodiments of the present disclosure include, for example, CHIMOSSORB 119, CHIMOSSORB 944, and CHIMOSSORB 2020, each of which is available from Ciba Specialty Chemicals. The structure of CHIMOSSORB 944 is shown in Formula 12 below, where x generally ranges between 4 and 5.

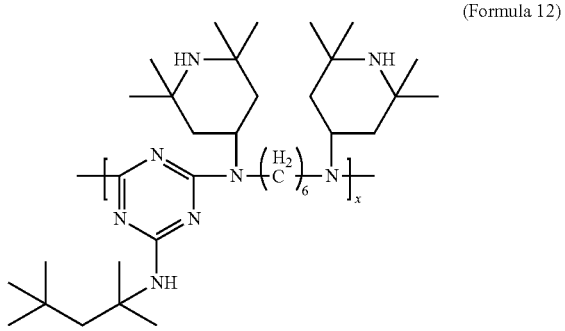

(Formula 12)

Although CHIMOSSORB 944 may be particularly desirable for implementing the various embodiments of the present disclosure, as exemplified in the Experimental Examples, it is to be recognized that any oligomeric polyamine meeting the above structural definitions may be used in a like manner.

The hydrophobic modifications that may be bonded to at least a portion of the nitrogen atoms of the oligomeric polyamine will now be further discussed. In various embodiments, the hydrophobic modifications added to the oligomeric polyamine may comprise any combination of hydrophobic groups comprising about 4 to about 30 carbon atoms. In some embodiments, the hydrophobic groups may comprise about 6 to about 24 carbon atoms, or between about 8 and about 18 carbon atoms. Additional heteroatom functionality, as well as carbon-carbon unsaturation, may also be present in the hydrophobic groups at any position. More specifically, in various embodiments, the hydrophobic groups may comprise any combination of alkyl groups, aryl groups, or acyl groups, any of which may comprise heteroatom functionality or carbon-carbon unsaturation at any position. According to various embodiments of the present disclosure, alkyl and acyl groups may comprise any of a straight carbon chain, a branched carbon chain, carbon-carbon unsaturation (e.g., a carbon-carbon double bond or triple bond), and any combination thereof.

Any suitable reaction technique may be used to introduce the hydrophobic groups onto at least a portion of the nitrogen atoms of the oligomeric polyamine. In some embodiments, suitable introduction methods may include, for example, amidation with carboxylic acids, carboxylic acid anhydrides, or carboxylic acid chlorides (e.g., with fatty acids or their anhydride or acid chloride derivatives). In some embodiments, suitable introduction methods may include, for example, alkylation of an amine with long chain alkyl halides or halide equivalents through nucleophilic attack. In some embodiments, suitable introduction methods may include, for example, reaction of an amine with an alpha-olefin containing a hydrophobic group or an epoxide containing a hydrophobic group. As indicated above, quaternization may take place in some alkylation embodiments.

In some embodiments, the hydrophobizing agents of the compositions described herein may be formed by reacting a hydrophobizing reactant with an oligomeric polyamine having a carbon atom:nitrogen atom ratio of about 4:1 or more. After reacting the oligomeric polyamine with the hydrophobizing reactant, the oligomeric polyamine may have an even greater carbon atom:nitrogen atom ratio than it did originally, as described above. In some embodiments, the hydrophobically modified oligomeric polyamine may be purified before being coated onto a plurality of particulates. In other embodiments, the hydrophobically modified oligomeric polyamine may be unpurified. In some embodiments, a crude reaction mixture containing the hydrophobically modified oligomeric polyamine may be mixed with a carrier fluid for coating particulates, or the crude reaction mixture may be used directly for coating a plurality of particulates in a dry coating process.

In addition to the hydrophobic groups comprising between about 4 and about 30 carbon atoms, discussed above, at least a portion of the nitrogen atoms in the oligomeric polyamine may be bonded to a group containing 1 to 3 carbon atoms. That is, hydrophobic groups containing about 4 to about 30 carbon atoms may be co-present in the hydrophobizing agents described herein with groups containing 1 to 3 carbon atoms. The groups containing 1 to 3 carbon atoms may be alkyl groups (e.g., methyl, ethyl, propyl, or isopropyl groups) or acyl groups (e.g., formyl, acetyl, or propionyl groups). In some embodiments, functionalization with a group containing 1 to 3 carbon atoms may be used to further tailor the properties of the hydrophobizing agents described herein. For example, exhaustive alkylation or acylation with groups containing 1 to 3 carbon atoms may be conducted following hydrophobic functionalization to temper any unwanted reactivity of primary or secondary amines.

In some embodiments, the compositions described herein comprising a hydrophobizing agent may further comprise a carrier fluid. Since the hydrophobizing agent is exceedingly hydrophobic, the carrier fluid also generally possesses significant hydrophobic character. Illustrative carrier fluids that may be suitable for use in conjunction with the hydrophobizing agents described herein include, for example, organic solvents comprising a continuous phase, oil-in-water emulsions, water-in-oil emulsions and the like. The combination of the hydrophobizing agent and the carrier fluid may comprise a treatment fluid in some embodiments.

In some embodiments, the carrier fluid may comprise an aqueous fluid containing an organic co-solvent. In this regard, suitable aqueous fluids may include, for example, fresh water, acidified water, salt water, seawater, brine (e.g., a saturated salt solution), or an aqueous salt solution (e.g., a non-saturated salt solution). Suitable organic co-solvents may include those soluble in water such as, for example, alcohols, glycols, glycol ethers, glycerol, acetone, tetrahydrofuran, and the like. In some embodiments, small amounts of a hydrocarbon may be admixed with an aqueous carrier fluid, which may comprise an oil-in-water emulsion in some embodiments.

In some embodiments, the carrier fluid may be foamed. In such embodiments, the carrier fluid may contain a gas and an optional foaming agent in addition to the hydrophobizing agent. Suitable gases may include, for example, nitrogen, carbon dioxide, air, methane, helium, argon, or any combination thereof. Suitable foaming agents may include, for example, betaines, sulfated or sulfonated alkoxylates, alkyl quaternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates, trimethyl hexadecyl ammonium bromide, the like, and any combination thereof. Suitable concentrations of a foaming agent, when present, may range between about 0.5 wt. % to about 2 wt. % of the carrier fluid. The foam quality may range from about 5% to about 95% in various embodiments, most typically from a foam quality of about 85% to about 95%, or about 90% to about 95%.

In some embodiments, a surfactant may also be present to promote dissolution of the hydrophobizing agent in an aqueous carrier fluid. Suitable surfactants for promoting dissolution will be familiar to one having ordinary skill in the art.

The concentration of the hydrophobizing agent in the carrier fluid may vary over a considerable range. In some embodiments, the concentration of the hydrophobizing agent may range between about 0.005 wt. % to about 10 wt. % of the carrier fluid. In more specific embodiments, the concentration of the hydrophobizing agent in the carrier fluid may range between about 0.01 wt. % to about 5 wt. %, or between about 0.05 wt. % to about 2.5 wt. %. The chosen concentration of the hydrophobizing agent in the carrier fluid may be dictated to some degree whether the hydrophobizing agent is being used to coat particulates before their introduction to a subterranean formation, or whether a surface within a subterranean formation is being directly coated. The solubility of the hydrophobizing agent and the viscosity of the carrier fluid once the hydrophobizing agent has been incorporated therein may also dictate the chosen concentration employed in a particular application.

In some embodiments, the compositions comprising a hydrophobizing agent described herein may further comprise a plurality of particulates, in which the hydrophobizing agent forms a coating on the particulates. In some embodiments, a coating comprising the hydrophobizing agent may be formed on particulates in a carrier fluid. A coating may be formed on particulates in some embodiments by dispersing the particulates in a carrier fluid containing the hydrophobizing agent. In other embodiments, a coating may be formed on particulates by spraying or pouring a carrier fluid containing the hydrophobizing agent onto a plurality of particulates. In still other embodiments, a coating comprising the hydrophobizing agent may be formed on particulates without a carrier fluid being present or with minimal carrier fluid being present. That is, in some embodiments, the hydrophobizing agent may form a coating on the particulates via a dry coating process. As used herein, the term "dry coating process" does not necessarily imply that the hydrophobizing agent is present in solid form, simply that it is applied to a plurality of particulates without a carrier fluid being present or with minimal carrier fluid being present. Minimal carrier fluid application processes may take place by placing the hydrophobizing agent in a suitable solvent, applying it to the particulates, and removing the solvent from the particulates by any suitable technique (e.g., evaporation).

The particulates being coated with the hydrophobizing agents described herein are not believed to be particularly limited. In various embodiments, particulates that may be coated with the hydrophobizing agents include, for example, formation fines, formation sand, proppant particulates, gravel particulates, and the like.

Suitable proppant particulates may include, for example, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the embodiments described herein. In particular embodiments, the mean particulate size distribution may include one or more of 6/12, 8/16, 12/20, 16/30, 20/40, 30/50, 40/60, 40/70, or 50/70 mesh particulates. Moreover, fibrous materials may be coated with the hydrophobizing agent in certain embodiments of the present disclosure.

In some embodiments, the compositions described herein may further comprise a silane coupling agent. The silane coupling agent may aid in the adherence of the hydrophobizing agent to a surface, such as a particulate surface. Illustrative silane coupling agents that may be suitable for use in the embodiments described herein include, but are not limited to, common coupling agents like N-2-(aminoethyl)-3-aminopropyltrimethoxysilane, 3-glycidoxypropyltrimethoxysilane, and any combination thereof. In some embodiments, the silane coupling agent may be present in an amount between a lower quantity of about 0.001%, 0.05%, or 0.1% by weight of the hydrophobizing agent and an upper quantity of about 3%, 1%, or 0.5% by weight of the hydrophobizing agent. The foregoing amounts may be converted into a concentration range when both the hydrophobizing agent and the silane coupling agent are present in a carrier fluid.

In further embodiments, the compositions described herein may optionally further comprise any number of additional additives commonly used in conducting various wellbore operations. These further additives may include, for example, oxidants, anti-oxidants, polymer degradation prevention additives, relative permeability modifiers, scale inhibitors, corrosion inhibitors, chelating agents, surfactants, foaming agents, defoaming agents, antifoam agents, emulsifying agents, de-emulsifying agents, iron control agents, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), lubricants, breakers, delayed release breakers, friction reducers, bridging agents, viscosifiers, weighting agents, solubilizers, pH control agents (e.g., buffers), hydrate inhibitors, consolidating agents, crosslinking agents, scale inhibitors, bactericides, biocides, and the like. Combinations of these additives may be used as well. Illustrative examples of these additives and situations in which their use may be desirable will be familiar to one having ordinary skill in the art.

The hydrophobizing agents described herein may be used in conducting various subterranean treatment operations. Such treatment operations vary widely in scope and may include, for example, drilling operations, stimulation operations, remediation operations, consolidation operations, fines control operations, and the like. In more specific embodiments, methods for using the hydrophobizing agents in a treatment operation may comprise forming a coating on particulates within a subterranean formation or introducing particulates coated with the hydrophobizing agent into a subterranean formation. The methods may further comprise collecting or agglomerating particulates about the coated particulates within the subterranean formation.

In some embodiments, methods described herein may comprise: providing a composition comprising a hydrophobizing agent comprising an oligomeric polyamine having a carbon atom:nitrogen atom ratio of about 4:1 or more, and a plurality of hydrophobic groups bonded to at least a portion of the nitrogen atoms in the oligomeric polyamine; and forming coated particulates comprising a coating of the hydrophobizing agent on one or more particulates.

In some embodiments, the methods may further comprise reacting the oligomeric polyamine with a reagent comprising the hydrophobic groups. The oligomeric polyamine may react at one or more of its nitrogen atoms to render the oligomeric polyamine even more hydrophobic than it was before. Suitable reaction types can include, for example, alkylation of the amine groups, acylation of the amine groups, reaction of the amine groups with an alpha-olefin, reaction of the amine groups with an epoxide, or any combination thereof. In some embodiments, the methods of coating may comprise coating the particulates with the oligomeric polyamine before reacting it with the reagent comprising the hydrophobic groups. In other embodiments, the oligomeric polyamine may be rendered hydrophobic before being coated onto the particulates.

When forming a coating on one or more particulates, the coating may be formed before the particulates are introduced into the subterranean formation or afterward. When formed on the particulates before their introduction to the subterranean formation, the hydrophobizing agent may be applied to the particulates in a carrier fluid, or it may be dry coated onto the particulates. When a coating is formed on particulates within a subterranean formation, the hydrophobizing agent is generally introduced into the subterranean formation in a carrier fluid, as generally discussed above. A carrier fluid may also be used when introducing coated particulates into the subterranean formation. In some embodiments, the hydrophobizing agent may be introduced to the particulates on-the-fly as they are being introduced into the subterranean formation in a carrier fluid. Once formed in the subterranean formation or introduced to the subterranean formation, the coated particulates may desirably mitigate the presence of fines and other loose particulates within the subterranean formation by agglomerating the fines around the hydrophobic coating.

In some embodiments, a carrier fluid containing coated particulates may be introduced to a subterranean formation in conjunction with a fracturing operation, a frac-packing operation, a gravel packing operation, or any combination thereof. When used in conjunction with a fracturing operation, the carrier fluid may be introduced to the subterranean formation at a pressure above the fracture gradient of the subterranean formation, such that at least one fracture is created or extended therein. In embodiments where a carrier fluid is introduced into a subterranean formation and coats particulates already present therein, the same types of treatment operations may also be conducted.

In some embodiments, a carrier fluid containing the hydrophobizing agent may be introduced to a subterranean formation and then followed by a high viscosity fluid that serves to further push the hydrophobizing agent deeper into the formation. Suitable high viscosity fluids may include, for example, water, brines, polymer-viscosified fluids, and the like.

By way of nonlimiting example, some embodiments of a fracturing operation may involve introducing a prepad fluid comprising a hydrophobizing agent to a subterranean formation; introducing a pad fluid, optionally comprising the hydrophobizing agent, to the subterranean formation at a pressure sufficient to create or extend at least one fracture therein; and introducing a proppant slurry comprising proppant and optionally the hydrophobizing agent to the subterranean formation. In some embodiments, the proppant slurry may comprise proppant particulates that are coated with the hydrophobizing agent. In other alternative embodiments, the prepad fluid may comprise other additives (e.g., clay stabilizing agents) but no traditional tackifiers or hydrophobizing agent. In still other alternative embodiments, the prepad and pad fluids may comprise no tackifier, and the proppant slurry alone may comprise the hydrophobizing agent, either dispersed in the proppant slurry or coated onto the proppant particulates. In still other alternative embodiments, the prepad fluid, the pad fluid, and the proppant slurry may each lack the hydrophobizing agent, but it may be present in a fluid flush added after the proppant slurry.

In some embodiments, methods described herein may comprise forming a proppant pack with proppant particulates. In some embodiments, the proppant particulates may be coated with the hydrophobizing agent before forming the proppant pack. In other embodiments, the proppant pack may first be set and then undergo coating with the hydrophobizing agent thereafter. Gravel packs may be formed in a similar manner.

In some embodiments, a carrier fluid comprising the hydrophobizing agent may be used in conjunction with a remediation operation. In such embodiments, a carrier fluid comprising the hydrophobizing agent may be introduced to the subterranean formation following another treatment operation so as to consolidate formation fines or other particulates that may be loosely circulating within the subterranean formation. In some embodiments, the hydrophobizing agents described herein may be introduced to a subterranean formation in a remediation operation following an acidizing operation. Remediation operations with the hydrophobizing agent may take place before production begins in some embodiments. In other embodiments, if unwanted fines production takes place with a desired hydrocarbon resource or other produced fluid, a remediation operation may take place before further production takes place.

In other various embodiments, systems configured for delivering the hydrophobizing agents described herein to a downhole location are described. In various embodiments, the systems can comprise a pump fluidly coupled to a tubular, the tubular containing a composition comprising a hydrophobizing agent comprising an oligomeric polyamine having a carbon atom:nitrogen atom ratio of about 4:1 or more, and a plurality of hydrophobic groups bonded to at least a portion of the nitrogen atoms in the oligomeric polyamine. In some embodiments, the system may comprise the hydrophobizing agent in a carrier fluid. In still further embodiments, the systems may comprise a plurality of particulates in the carrier fluid.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the hydrophobizing agent to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the hydrophobizing agent to the high pressure pump. In such embodiments, the low pressure pump may "step up" the pressure of the hydrophobizing agent before it reaches the high pressure pump.

In some embodiments, the systems described herein can further comprise a mixing tank that is upstream of the pump and in which the hydrophobizing agent is combined with a carrier fluid. In various embodiments, the pump (e.g., a low pressure pump, a high pressure pump, or a combination thereof) may convey the carrier fluid from the mixing tank or other source of the carrier fluid to the tubular. In other embodiments, however, the hydrophobizing agent can be formulated in the carrier fluid offsite and transported to a worksite, in which case the hydrophobizing agent may be introduced to the tubular via the pump directly from its shipping container (e.g., a truck, a railcar, a barge, or the like) or from a transport pipeline. In either case, the hydrophobizing agent may be drawn into the pump, elevated to an appropriate pressure, and then introduced into the tubular for delivery downhole.

FIG. 1 shows an illustrative schematic of a system that can deliver hydrophobizing agents of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a hydrophobizing agent of the present disclosure may be formulated. The hydrophobizing agent may be conveyed via line 12 to wellhead 14, where the hydrophobizing agent enters tubular 16, tubular 16 extending from wellhead 14 into subterranean formation 18. Tubular 16 may include orifices that allow the hydrophobizing agent to enter into the subterranean formation. Upon being ejected from tubular 16, the hydrophobizing agent may subsequently penetrate into subterranean formation 18. Pump 20 may be configured to raise the pressure of the hydrophobizing agent to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 1, the hydrophobizing agent may, in some embodiments, flow back to wellhead 14 and exit subterranean formation 18. In some embodiments, the hydrophobizing agent that has flowed back to wellhead 14 may subsequently be recovered and recirculated to subterranean formation 18. In other embodiments, the hydrophobizing agent may flow back to wellhead 14 in a produced hydrocarbon fluid from the subterranean formation.

It is also to be recognized that the hydrophobizing agent may also directly or indirectly affect the various downhole equipment and tools that may come into contact with the hydrophobizing agent during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. Methods for forming a coating. The methods comprise: providing a composition comprising: a hydrophobizing agent comprising an oligomeric polyamine having a carbon atom:nitrogen atom ratio of about 4:1 or more, and a plurality of hydrophobic groups bonded to at least a portion of the nitrogen atoms in the oligomeric polyamine; and forming coated particulates comprising a coating of the hydrophobizing agent on one or more particulates.

B. Compositions comprising a hydrophobizing agent. The compositions comprise: a hydrophobizing agent comprising an oligomeric polyamine having a carbon atom:nitrogen atom ratio of about 4:1 or more, and a plurality of hydrophobic groups bonded to at least a portion of the nitrogen atoms in the oligomeric polyamine.

C. Systems for delivering a hydrophobizing agent to a downhole location. The systems comprise: a pump fluidly coupled to a tubular, the tubular containing a composition comprising a hydrophobizing agent comprising an oligomeric polyamine having a carbon atom:nitrogen atom ratio of about 4:1 or more, and a plurality of hydrophobic groups bonded to at least a portion of the nitrogen atoms in the oligomeric polyamine.

Each of embodiments A, B and C may have one or more of the following additional elements in any combination:

Element 1: wherein the method further introducing the coated particulates into a subterranean formation in a carrier fluid.

Element 2: wherein the carrier fluid is introduced into the subterranean formation in conjunction with a fracturing operation, a frac-packing operation, a gravel packing operation, or any combination thereof.

Element 3: wherein forming coated particulates comprises dry coating a plurality of particulates with the hydrophobizing agent.

Element 4: wherein forming coated particulates comprises: placing a plurality of particulates and the hydrophobizing agent in a carrier fluid; and allowing the hydrophobizing agent to at least partially coat the particulates in the carrier fluid, thereby forming the coated particulates.

Element 5: wherein the method further comprises introducing the hydrophobizing agent into a subterranean formation in a carrier fluid, the hydrophobizing agent coating particulates within the subterranean formation to form the coated particulates.

Element 6: wherein the one or more particulates comprise a component in the subterranean formation that is selected from the group consisting of formation fines, formation sand, proppant particulates, gravel particulates, and any combination thereof.

Element 7: wherein a concentration of the hydrophobizing agent in the carrier fluid ranges between about 0.01% to about 5% by weight of the carrier fluid.

Element 8: wherein the hydrophobic groups comprise between about 4 and about 30 carbon atoms.

Element 9: wherein a portion of the nitrogen atoms in the oligomeric polyamine are bonded to a group comprising 1 to 3 carbon atoms.

Element 10: wherein the oligomeric polyamine comprises an aromatic group in its backbone.

Element 11: wherein the oligomeric polyamine comprises at least a 2,2,6,6-tetramethylpiperidine moiety.

Element 12: wherein the composition further comprises a silane coupling agent.

Element 13: wherein the hydrophobizing agent is cationic.

Element 14: wherein the hydrophobizing agent comprises at least one quaternized nitrogen atom.

Element 15: wherein the hydrophobizing agent comprises at least one protonated nitrogen atom.

Element 16: wherein the composition further comprises a plurality of particulates, the hydrophobizing agent comprising a coating on the plurality of particulates.

Element 17: wherein the composition further comprises a carrier fluid, the hydrophobizing agent being present in the carrier fluid in an amount ranging between about 0.01% to about 5% by weight of the carrier fluid.

By way of non-limiting example, exemplary combinations applicable to A, B and C include:

The method of A in combination with elements 1 and 2.
The method of A in combination with elements 1 and 7.
The method of A in combination with elements 4 and 7.
The method of A in combination with elements 5 and 6.
The method of A in combination with elements 8 and 9.
The method of A in combination with elements 8 and 10.
The method of A in combination with elements 8 and 11.
The method of A in combination with elements 8, 10 and 11.
The composition of B or the system of C in combination with elements 16 and 17.
The composition of B or the system of C in combination with elements 8 and 9.
The composition of B or the system of C in combination with elements 8 and 10.
The composition of B or the system of C in combination with elements 8 and 11.
The composition of B or the system of C in combination with elements 8, 10 and 11.
The composition of B or the system of C in combination with elements 8 and 12.
The composition of B or the system of C in combination with elements 8 and 13.
The composition of B or the system of C in combination with elements 13 and 17.

To facilitate a better understanding of the embodiments of the present disclosure, the following examples of preferred or representative embodiments are given. In no way should the following examples be read to limit, or to define, the scope of the disclosure.

EXAMPLES

Example 1: Alkylation Reaction of CHIMASSORB 944

In a 100 ml roundbottom flask was placed 10 mL of toluene and 2 grams of CHIMASSORB 944. 4-grams of 1-bromohexadecane was then added, and the combined reaction mixture was then heated at 110° C. for 40 hours. The crude reaction product in the toluene reaction medium was used directly for the examples below without further purification. No attempt was made to sequester the liberated HBr and prevent it from reacting with free amines in the CHIMASSORB 944.

Example 2: Fines Control Testing

To a 200 mL glass jar was added 2 mL of the reaction mixture from Example 1 and 50 grams of 20/40 sand. The resulting dry mixture was mixed thoroughly and then washed extensively with water, which was discarded. Thereafter, 100 mL of water was added to the jar, followed by 0.1 grams of coal fines having a particle size of less than 200 mesh (<74 microns). The mixture of the coated particulates and coal fines was then shaken for a brief period of time. Almost all the coal fines were captured on the sand, and a clear water layer was obtained. When untreated sand was employed under the same conditions, the coal fines were significantly dispersed into the water layer.

Example 3: Simulation of Downhole Particulate Coating 5 grams of coal fines having a particle size less than 200 mesh (<74 microns) was mixed with 61 grams of 20/40 Brady sand. The combination of the coal fines and sand was then packed in a 5 inch long brass cylinder having an internal diameter of 1.375 inches between a lower layer of 66 grams of 20/40 Brady sand and an upper layer of 66 grams of 40/70 Brady sand. Before packing into the column took place, the layers were separately treated with 1.5 wt. % of the reaction mixture from Example 1 in a dry coating process. After loading the column, it was heated to 180° F. and flowed with 2 pore volumes (100 mL) of 5% aqueous KCl. Water was then flowed through the column in the opposite direction to simulate production. The initial water flow rate was 40 mL/min, which was thereafter increased to 50 mL/min and 60 mL/min. Periodic collection of the eluent showed essentially no visual breakthrough of the coal fines.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While embodiments are described in terms of "comprising," "containing," or "including" various components or steps, the embodiments can also "consist essen-

What is claimed is the following:

1. A method comprising:
   providing a composition comprising:
   a hydrophobizing agent comprising an oligomeric polyamine having a carbon atom:nitrogen atom ratio of about 4:1 or more, and a plurality of hydrophobic groups bonded to at least a portion of the nitrogen atoms in the oligomeric polyamine; and
   forming coated particulates comprising a coating of the hydrophobizing agent on one or more particulates,
   wherein the hydrophobizing agent is cationic and comprises at least one of: one quaternized nitrogen atom, or one protonated nitrogen atom.

2. The method of claim 1, further comprising:
   introducing the coated particulates into a subterranean formation in a carrier fluid.

3. The method of claim 2, wherein the carrier fluid is introduced into the subterranean formation in conjunction with a fracturing operation, a frac-packing operation, a gravel packing operation, or any combination thereof.

4. The method of claim 1, wherein forming coated particulates comprises dry coating a plurality of particulates with the hydrophobizing agent.

5. The method of claim 1, wherein forming coated particulates comprises:
   placing a plurality of particulates and the hydrophobizing agent in a carrier fluid; and
   allowing the hydrophobizing agent to at least partially coat the particulates in the carrier fluid, thereby forming the coated particulates.

6. The method of claim 1, further comprising:
   introducing the hydrophobizing agent into a subterranean formation in a carrier fluid, the hydrophobizing agent coating particulates within the subterranean formation to form the coated particulates.

7. The method of claim 6, wherein the one or more particulates comprise a component in the subterranean formation that is selected from the group consisting of formation fines, formation sand, proppant particulates, gravel particulates, and any combination thereof.

8. The method of claim 6, wherein a concentration of the hydrophobizing agent in the carrier fluid ranges between about 0.01% to about 5% by weight of the carrier fluid.

9. The method of claim 1, wherein the hydrophobic groups comprise between about 4 and about 30 carbon atoms.

10. The method of claim 9, wherein a portion of the nitrogen atoms in the oligomeric polyamine are bonded to a group comprising 1 to 3 carbon atoms.

11. The method of claim 1, wherein the oligomeric polyamine comprises an aromatic group in its backbone.

12. The method of claim 1, wherein the oligomeric polyamine comprises at least a 2,2,6,6-tetramethylpiperidine moiety.

13. The method of claim 1, wherein the composition further comprises a silane coupling agent.

14. The method of claim 1, wherein the oligomeric polyamine is represented by Formula 12 below

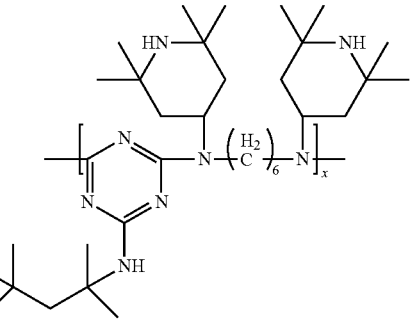

wherein X represents an integer 4 or 5.

15. The method of claim 13, wherein the silane coupling agent is N-2-(aminoethyl)-3-aminopropyltrimethoxysilane.

16. The method of claim 4, wherein the plurality of particulates are proppant particulates.

* * * * *